No. 841,790. PATENTED JAN. 22, 1907.
N. LEIDGEN.
DUST GUARD FOR AUTOMOBILES.
APPLICATION FILED JAN. 22, 1906.
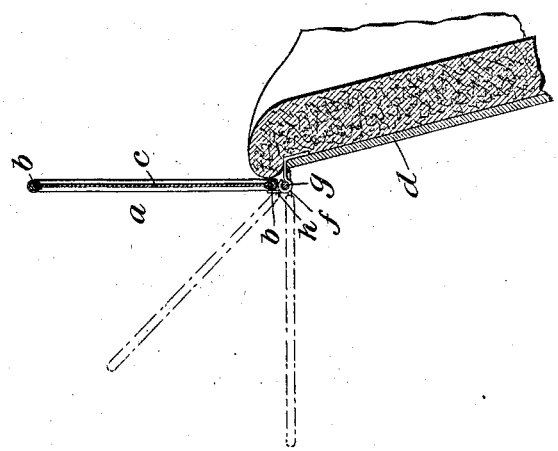
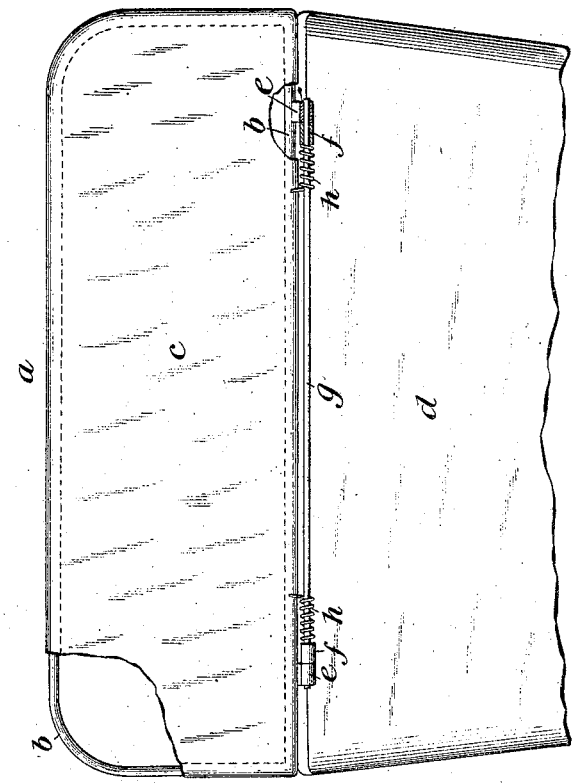
Witnesses: Inventor:

UNITED STATES PATENT OFFICE.

NICOLAUS LEIDGEN, OF MILWAUKEE, WISCONSIN.

DUST-GUARD FOR AUTOMOBILES.

No. 841,790.  Specification of Letters Patent.  Patented Jan. 22, 1907.

Application filed January 22, 1906. Serial No. 297,165.

*To all whom it may concern:*

Be it known that I, NICOLAUS LEIDGEN, a citizen of the United States, residing at Milwaukee, in the county of Milwaukee and State of Wisconsin, have invented certain new and useful Improvements in Dust-Guards for Automobiles and the Like, of which the following is a specification, reference being had to the accompanying drawings, forming a part thereof.

The main object of this invention is to prevent dust and dirt from being drawn over the backs of automobiles and fast-moving vehicles with the air-currents caused thereby.

It consists in certain novel features of construction and in the peculiar arrangement and combinations of parts, as hereinafter particularly described, and pointed out in the claims.

In the accompanying drawings like characters designate the same parts in both figures.

Figure 1 is a rear view of a dust-guard as constructed and attached to the back of a vehicle according to the present invention, a part of the guard being broken away to better illustrate its construction; and Fig. 2 is a vertical cross-section of the same, different positions assumed by the guard when in use being indicated by dotted lines.

The guard $a$ preferably consists of a light metal frame $b$ and a covering $c$, of leather, waterproof canvas, or similar material. It is attached to the back $d$ of a vehicle by hinges, one leaf $e$ of each hinge being formed with or attached to the lower part of the frame $b$, while the other leaf $f$ is fastened to the top or upper part of the back $d$. A rod $g$ passes through and pivotally connects the leaves or members of both hinges. Springs $h$, coiled around the rod $g$, are at one end attached to or engaged with the fixed hinge members $f$ or other fixed parts of the device or vehicle, while at the other end they are attached to or engaged with the guard $a$, thus serving to hold it normally in an upright position, as shown in the drawings.

When the vehicle is moving at moderate speed, the yielding guard maintains an approximately upright position; but when the vehicle is running at greater speeds the increased air-pressure thus caused forces the guard backward more or less, as indicated by dotted lines in Fig. 2, against the tension of the springs $h$, and dust or dirt that is raised by the vehicle and would otherwise be carried up behind and into it is intercepted by the guard and deflected away from the occupants of the vehicle.

Swinging backward more or less, according to the varying speed of the vehicle and the varying air-pressure against it, the guard automatically assumes different positions which are most effective at different speeds and under varying conditions for intercepting and deflecting the dust and dirt raised by the passage of the vehicle without checking the speed or obstructing the progress of the vehicle.

Various changes in details of construction and arrangement of parts may be made without departing from the principle and intended scope of the invention.

I claim—

1. A dust-guard yieldingly connected with the back of a vehicle and comprising means adapted to normally hold it in an upright position and when relieved of wind-pressure to automatically return it to that position, substantially as described.

2. A dust-guard hinged to the back of a vehicle and having a yielding connection therewith tending to hold it in an upright position and permitting it to be automatically swung backward more or less toward a horizontal position by wind-pressure, substantially as described.

3. A dust-guard hinged to the back of a vehicle and a spring tending to hold it in an upright position, substantially as described.

4. A yielding dust-guard hinged at its lower edge to the upper part of the back of a vehicle and a spring tending to hold the guard in an upright position, substantially as described.

5. In combination with a vehicle, a dust-guard connected by hinges at its lower edge to the upper part of the vehicle-back, the members of the hinges being connected by a pivot-rod, and springs coiled around said rod and engaged at one end with fixed parts and at the other with said guard which is yieldingly and normally held thereby in an upright position, substantially as described.

In witness whereof I hereto affix my signature in presence of two witnesses.

NICOLAUS LEIDGEN.

Witnesses:
JOHN H. HURLEY,
BERNARD C. ROLOFF.